March 6, 1956 — R. GAERTNER — 2,737,151

SPLIT RING TUBULAR HAND MILKER DEVICE

Filed Feb. 25, 1955

Richard Gaertner
INVENTOR.

United States Patent Office 2,737,151
Patented Mar. 6, 1956

2,737,151

SPLIT RING TUBULAR HAND MILKER DEVICE

Richard Gaertner, Moulton, Tex.

Application February 25, 1955, Serial No. 490,533

5 Claims. (Cl. 119—14.22)

This invention generally relates to a hand milker and more specifically provides a device which will permit the milking operation to be conducted with an expenditure of less energy thereby causing less fatigue.

An object of the present invention is to provide a flexible sleeve member for telescopic engagement over a teat including a finger receiving ring thereon and overlapping end portions to permit flexible collapse of the sleeve during sequential squeezing of the teat normally employed during the milking operation.

A further object of the present invention is to provide a hand milker that is simple in construction, efficient in operation, that forms an enlargement for the teat thereby reducing the fatigue caused by sequential gripping, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
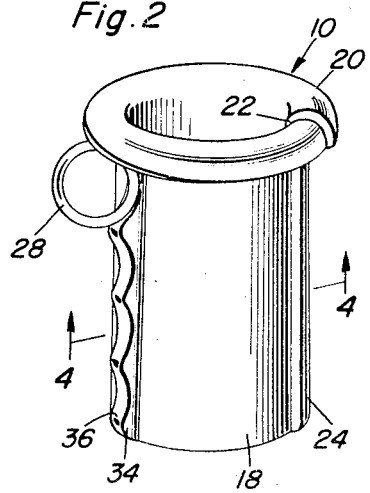
Figure 2 is a perspective view of the hand milker per se.
Figure 3:
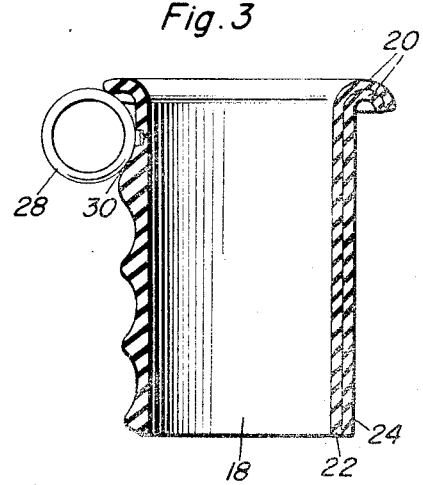
Figure 4:
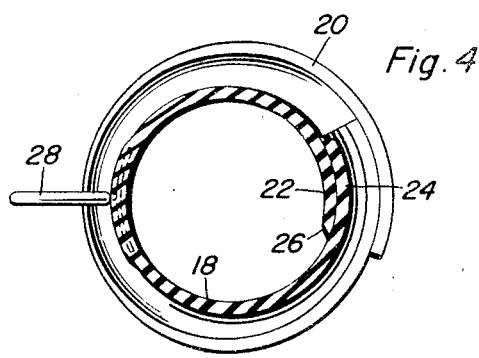

Figure 3 is a vertical, sectional view taken substantially upon a plan passing along the longitudinal center line of the construction of Figure 2; and Figure 4 is a plan sectional view taken substantially upon a plane passing along section line 4—4 of Figure 2 showing the details of construction thereof and the relationship of the overlapping end portions and the manner of attaching the finger receiving ring.

Referring now specifically to the drawings, it will be seen that the numeral 10 generally designates the hand milker of the present invention for telescopic engagement over a teat 12 normally positioned on the udder 14 of a cow. The hand milker 10 of the present invention is adapted to be telescopically positioned over a teat 12 and gripped by the hand 16 of the person performing the milking operation, in a manner described hereinafter.

The hand milker 10 generally includes a tubular sleeve member 18 constructed of flexible resilient material and including an outwardly extending and downwardly projecting peripheral flange 20 at the upper end thereof which is smoothly curved for forming a smooth surface for contacting the area of the teat 12 adjacent the bottom of the udder 14. The sleeve 18 is provided with a longitudinal slit defined by overlapping portions 22 and 24 wherein the inner portion 22 is provided with a beveled edge 26 for engaging the teat 12 in a smooth manner.

Figure 1:
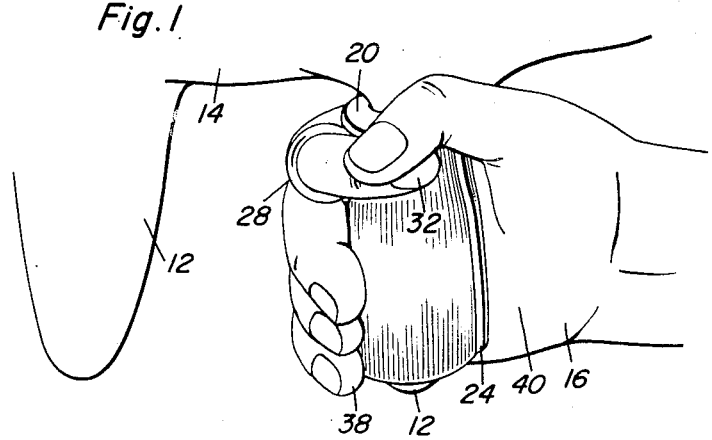
Figure 1 is a perspective view of the hand milker of the present invention positioned in telescoping engagement over a teat and showing a person's hand positioned thereon in the manner in which the present device is to be operated.

Adjacent the upper end of the sleeve 18 and in diametrically opposed relation to the overlapping portions 22 and 24, a finger receiving ring 28 is provided with a generally curved attaching member 30 that is embedded into the side wall of the sleeve 18 whereby the ring 28 is disposed in vertical relation to the sleeve 18 and forms a ring for engaging the first finger 32 of the milker's hand 16, as illustrated in Figure 1.

Extending downwardly from the ring 28 and positioned on the outer surface of the sleeve 18 is a projecting rib 34 having a plurality of concave recesses 36 for receiving other fingers 38 on the milker's hand 16 wherein the finger ring 28 and the recesses 36 form a grip for engaging the fingers 32 and 38 and the overlapping portion generally will engage the palm 40 of the hand 16 as illustrated in Figure 1 during sequential gripping and releasing of the sleeve 18 whereby the teat 12 will be sequentially squeezed and released during the milking operation.

During practical use, the sleeve 18 is disposed over the teat 12 and is generally coextensive therewith and in operation, the first finger 32 is initially squeezed thereby collapsing the upper end of the sleeve 18 around the teat 12 after which the remaining fingers 38 are squeezed inwardly thereby squeezing the teat 12 in the usual manner for extracting milk therefrom. It will be seen that the sleeve 18 generally forms an enlargement for the teat 12 thereby eliminating the fatigue caused by sequential gripping of the relatively small teat 12 and the sleeve 18 also facilitates the milking operation and permits such operation to be conducted in a more sanitary manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A hand milker comprising a tubular sleeve of flexible material for telescopic engagement over a teat, a finger receiving ring secured to the outer surface of said sleeve adjacent the upper end thereof, said sleeve having a longitudinal slit with overlapping ends for permitting collapse of the sleeve about the teat for extracting fluid therefrom.

2. A hand milker comprising a tubular sleeve of flexible material for telescopic engagement over a teat, a finger receiving ring secured to the outer surface of said sleeve adjacent the upper end thereof, said sleeve having a longitudinal slit with overlapping ends for permitting collapse of the sleeve about the teat for extracting fluid therefrom, said sleeve having an outwardly projecting rounded peripheral flange at the upper end thereof forming a smooth contact surface for contact with the teat.

3. A hand milker comprising a tubular sleeve of flexible material for telescopic engagement over a teat, a finger receiving ring secured to the outer surface of said sleeve adjacent the upper end thereof, said sleeve having a longitudinal slit with overlapping ends for permitting collapse of the sleeve about the teat for extracting fluid therefrom, said sleeve having a vertically disposed rib on the outer surface thereof disposed under said ring, said rib having a plurality of concave recesses for receiving the fingers during sequential gripping of the sleeve.

4. A hand milker comprising a tubular sleeve of flexible material for telescopic engagement over a teat, a finger receiving ring secured to the outer surface of said sleeve adjacent the upper end thereof, said sleeve having a longitudinal slit with overlapping ends for permitting collapse of the sleeve about the teat for extracting fluid therefrom, the overlapping portions of said sleeve being diametrically opposed to said ring for engagement with the palm of the hand during the milking operation.

5. A hand milker comprising a tubular sleeve of flexible material for telescopic engagement over a teat, a finger receiving ring secured to the outer surface of said sleeve adjacent the upper end thereof, said sleeve having a longitudinal slit with overlapping ends for permitting collapse of the sleeve about the teat for extracting fluid therefrom, said sleeve having an outwardly projecting rounded peripheral flange at the upper end thereof forming a smooth contact surface for contact with the teat, said sleeve having a vertically disposed rib on the outer surface thereof disposed under said ring, said rib having a plurality of concave recesses for receiving the fingers during sequential gripping of the sleeve.

References Cited in the file of this patent

UNITED STATES PATENTS

| | | |
|---|---|---|
| 641,441 | Duigan | Jan. 16, 1900 |
| 675,414 | Roth | June 4, 1901 |